United States Patent [19]

Easterday

[11] Patent Number: 5,726,408
[45] Date of Patent: Mar. 10, 1998

[54] WELD BACKING RING FOR NOZZLE REPAIRS

[75] Inventor: Arvid D. Easterday, Wadsworth, Ohio

[73] Assignee: The Babcock & Wilcox Company, New Orleans, La.

[21] Appl. No.: 485,560

[22] Filed: Jun. 7, 1995

[51] Int. Cl.[6] ............................................. B23K 9/035
[52] U.S. Cl. .......................... 219/61; 219/160; 228/50
[58] Field of Search ........................... 219/160, 136, 219/137 R, 61, 74; 228/50

[56] References Cited

U.S. PATENT DOCUMENTS

| | | | |
|---|---|---|---|
| 2,472,523 | 6/1949 | Dillon et al. | 219/160 |
| 3,960,311 | 6/1976 | Griffiths | 228/50 |
| 4,084,739 | 4/1978 | Koltz et al. | 228/44.5 |
| 4,103,816 | 8/1978 | Scholtus et al. | 228/50 |
| 4,144,439 | 3/1979 | Chang et al. | 219/160 |
| 4,465,220 | 8/1984 | Ledlow et al. | 228/50 |

FOREIGN PATENT DOCUMENTS 952952  3/1964  United Kingdom ............ 219/61

Primary Examiner—Clifford C. Shaw
Attorney, Agent, or Firm—Daniel S. Kalka; Robert J. Edwards

[57] ABSTRACT

A tube such as a nozzle to be repaired or tubular sections to be repaired or connected to each other, are welded using a backing ring having a groove in the area to be welded. The groove forms a purge space for purge gas between the ring and the tube to establish an inert atmosphere on both inner and outer surfaces of the tube during the welding operation. The ring is removed by making a bore in the ring having a diameter larger than the diameter of the groove but smaller than the diameter of the ring. In this way, the ring is divided into two portions which are easily removed from the tube.

6 Claims, 2 Drawing Sheets

WELD BACKING RING FOR NOZZLE REPAIRS

BACKGROUND OF THE INVENTION

1. Field of the Invention

The present invention relates, in general, to welding, and in particular, to a new and useful method and apparatus for making repairs in hollow tubular members or connecting hollow tubular members together, in particular, the nozzles and tubes of a steam generator.

2. Description of the Related Art

FIGS. 1 and 2 are side elevational views illustrating a known backing technique for welding a tubular structure, in particular, repairing or connecting nozzle walls or tubes 10 and 12 of a steam generator. As shown in FIG. 1, a backing ring 14 which fits tightly into the inside diameter (I.D.) of tube 10, 12, is positioned in place. A weld 16 is thereafter created, preferably in the presence of an inert gas.

After the welding step, internal grinding is used to remove the tightly fitted backing ring 14. Because of poor visibility, this often creates an under-grind area on the inner surface of the repaired or connected nozzle or tube 10, 12, shown at 20, where the inside surface of the tube or nozzle has been damaged by the grinding operation. FIGS. 5, 6 and 7 show another technique of the prior art which seeks to repair a breach, hole or damaged area 40 in a nozzle 42 having a base 43 connected to a plate, and a nozzle tip 41 welded to the base 43. According to the prior art, a partial backing strip 36 is bent into shape and welded on the inside diameter of nozzle 42 in preparation for welding the damaged area 40 as shown in FIG. 6. Subsequently, grinding often leaves an under-grinding area 37 which damages the inside diameter of the nozzle, producing undesirable flow patterns for the fluid that is passed through the nozzle.

SUMMARY OF THE INVENTION

According to one embodiment of the invention, a nozzle or tube which is to be repaired or connected to another tube by welding, is fitted with an inside spool or ring that carries an outer annular groove. The ring is tightly fit within the tube or nozzle in the area to be connected or repaired. This forms a purge space between the groove and the inside diameter of the tube or nozzle. The space receives purge gas during the welding operation via grooves ground vertically through the large diameter (one at each end). To remove the ring, a bore is drilled into the ring which has a diameter larger than the ring small outside diameter but smaller than the inside diameter of the tube. This breaks the backing ring into two parts which can be easily removed for final buffing or reaming of the inside surface of the weld.

The invention can also be used in a slightly different manner for repairing a hole in a nozzle.

In this embodiment, the invention uses a spool piece or modified backing ring that is inserted into the nozzle or tube so that it covers the damaged through wall hole or seam area. The outline of the hole is then traced onto the small outside diameter (O.D.) of the spool piece. The spool piece is withdrawn and a weld bead is put onto the outline of the hole on the spool piece. Two grooves are ground in the large O.D. of the spool piece (one at each end) and the spool piece is re-inserted. The grooves are used to allow inert gas to flow around the repair area to keep the backside of the weld repair from oxidizing. The inside of the hole and newly applied weld bead are lined up. The inert gas purge is established, and the hole edge is welded to the weld bead on the spool piece. The hole is then welded closed. The outside of the repair is ground to requirements and the spool piece is ready to be removed. The machining is done by boring a diameter (non-interrupted cut) larger than the spool piece small diameter but 0.010" to 0.015" smaller than the spool piece large diameter. This causes two small rings of material to be left inside the nozzle, but not attached to it. The one closest to the nozzle end may be easily retrieved by using a wire hook. The weld is then taken out of the I.D. by reaming to within 0.001" to 0.003" of the final size removing everything except the weld fusion line. The fusion line is lightly buffed and the remaining small ring of the spool piece is removed. The repaired nozzle is then ready to repeat non-destructive examinations to assure weld quality.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter in which preferred embodiments of the invention are illustrated.

DESCRIPTION OF THE PREFERRED EMBODIMENT

Figure 1:
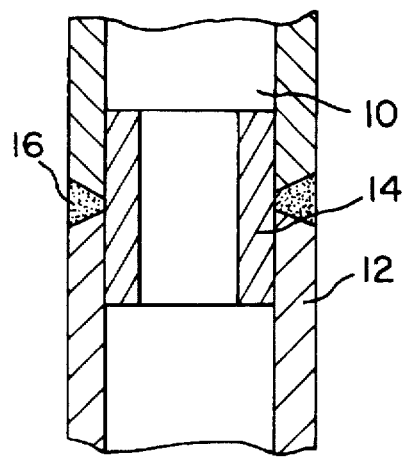
FIG. 1 is a sectional view of a prior art technique for backing a repair or connection area for a nozzle or tube.
Figure 2:
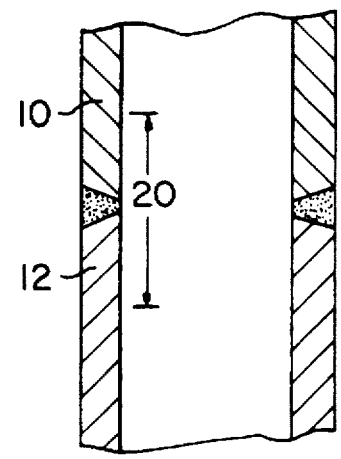
FIG. 2 is a view similar to FIG. 1 of a subsequent step in the operation.
Figure 3:
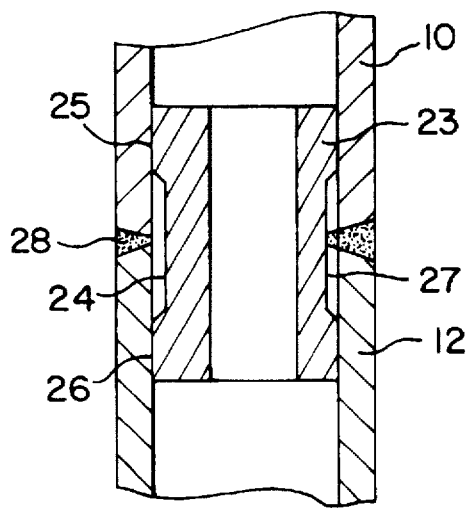
FIG. 3 is a sectional view showing an early step in the method of the present invention.

According to the present invention as shown in FIG. 3, a backing ring 23 is fit into the inside diameter of the tube or nozzle 10, 12 to be repaired. Backing ring 23 includes an annular groove 24 formed on the outside surface of the ring, leaving large diameter upper and lower portions 25, 26, which tightly fit against the inside diameter of tube or nozzle 10, 12. This also leaves a space 27 between the inside diameter of the tube or nozzle, and the outside diameter of ring 23, for receiving purge gas so that an inert atmosphere is established both inside and outside the weld area 28, during the welding operation.

Figure 4:
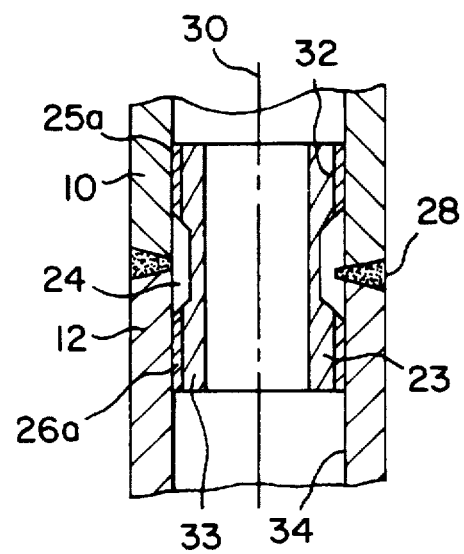
FIG. 4 is a view showing a subsequent step thereof.
Figure 5:
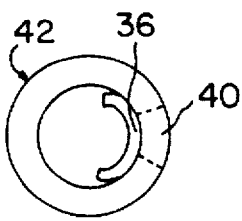
FIG. 5 is a plan view of a prior art nozzle showing a backing strip for facilitating a repair thereof.
Figure 6:
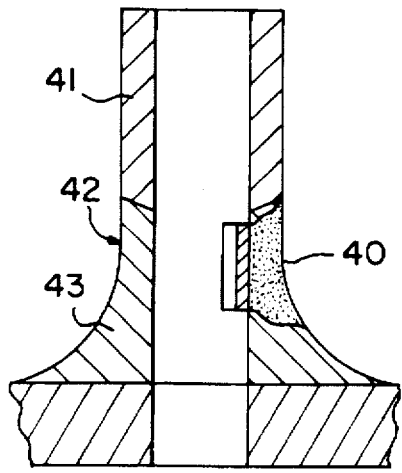
FIG. 6 is a sectional view of FIG. 5.
Figure 7:
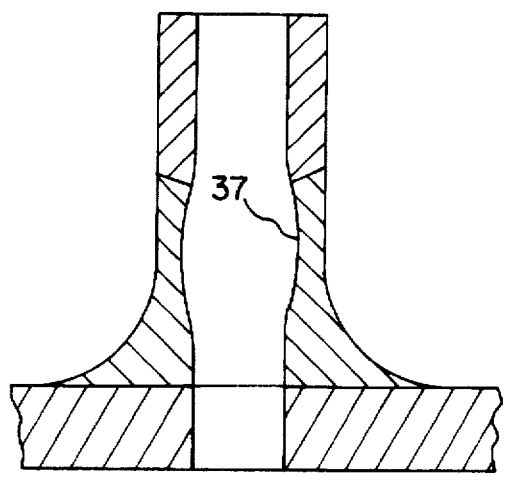
FIG. 7 is a view similar to FIG. 6 of a subsequent step in the prior art technique.

As shown in FIG. 4, subsequent to the welding operation, rather than haphazard grinding which may damage the inside diameter of the tube or nozzle, a central bore which extends from the axis 30 to the outer surface 32 of the bore, is formed in ring 23, removing the inner portion 33 of the bore. Since bore 32 is selected to have a diameter which is larger than the small diameter of groove 24, yet smaller than the outside diameter of ring 23, bore 32 divides ring 23 into upper and lower thin contact ring portions 25a and 26a, which can be easily removed because of their thin wall, using a hook wire or the like. By keeping the diameter of the bore 32, smaller than the inside diameter of tube 10, 12, damage to the inside wall of the tube or nozzle is precluded.

The inside diameter 34 of tube 10, 12 can be subsequently reamed, to smooth the inside surface of the weld 28. Buffing or light grinding may also be used in a manner which smooths the weld while not damaging the inside surface 34 of the tube or nozzle.

Figure 8:
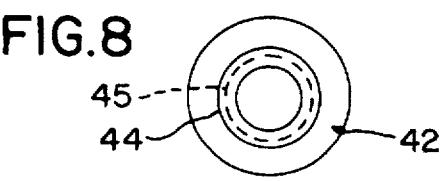
FIG. 8 is a view similar to FIG. 5 showing a spool or ring according to the present invention in a nozzle to be repaired.
Figure 9:
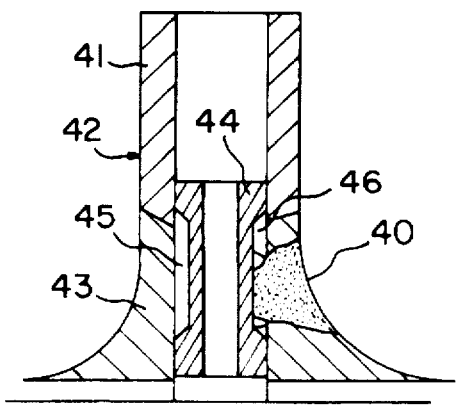
FIG. 9 is similar to FIG. 6 showing an early step in the process of the present invention.
Figure 10:
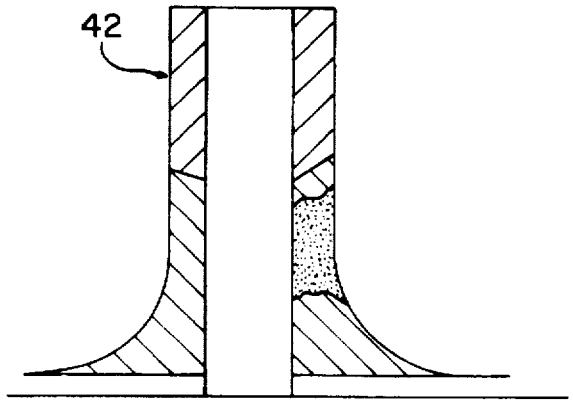
FIG. 10 is a view similar to FIG. 9 of a final step in the process of the present invention.

FIGS. 8, 9 and 10 show another embodiment of the invention for repairing damage 40 in the wall of a nozzle 42 which comprises a base 43 connected to a plate, for example, and a nozzle end 44, welded to the outer end of base 43. As with the embodiment of FIGS. 3 and 4, a backing ring 44 having an outer annular groove 45 is tightly fit within the nozzle and defines a purge space 46 for inert gas generated during the welding operation of a weld repair in damaged area 40. FIG. 10 illustrates the completed weld repair from which ring 44 has been removed by drilling a bore into the ring to divide it into parts, with the two remaining ring portions removed, and subsequent to an inner buffing or reaming operation.

FIGS. 9 and 10 also illustrate how a hole in the nozzle, also in area 40, can be repaired using the spool or ring 44. With the hole 40 unobstructed, ring 44 is put in place on the I.D. of nozzle 42, then a scribe line is made on the smaller diameter outer surface 45 of ring 44 which is then withdrawn. A weld bead is formed around the area of the hole on ring 44 at location 45 and then the ring is re-inserted and lined up with the hole 40. This in effect forms a weld bridge around the damaged area which retains purged gas while the area is filled with weld to repair the hole.

Specific embodiments of the sleeve can be formed as follows:

Using 1" diameter bar stock, a 0.562" hole is bored through the center of the stock. An annular groove having an axial length of about 1", is formed on the outer surface of the ring to reduce the outer diameter from approximately 0.957" to approximately 0.832". This ring can be used as a backing for small diameter nozzle/pipe repairs.

For larger repairs, a 1½" diameter bar stock is used with a 1.062" hole bored therein. The axial length of the groove can be 1¼" to 1⅝" and reduces the outside diameter to 1.336" from approximately 1.561".

The upper and lower ends of the grooves are chamfered, for example, by 45° in a typical case, and multiple grooves can be provided on a ring to make multiple repairs or joints.

While specific embodiments of the invention have been shown and described in detail to illustrate the application of the principles of the invention, it will be understood that the invention may be embodied otherwise without departing from such principles.

What is claimed is:

1. A method of welding a tube in a weld area, comprising the steps of:

fitting a ring having an outside diameter which is approximately equal to an inside diameter of the tube, into the tube and over the area to be welded;

providing an annular groove on the outside diameter of the ring which extends under the area to be welded to form a purge space between the ring and the tube;

inserting the ring into the tube before the repair is made;

scribing an area on the ring which corresponds to the area to be welded;

removing the scribed ring from the tube;

welding a bead in the vicinity of the scribed area;

re-inserting the ring into the tube until the bead corresponds with the area to be welded;

welding the area to be welded in the presence of a purge gas;

removing the ring by boring a hole into the ring which has a diameter greater than the diameter of the groove and smaller than the outside diameter of the ring, to divide the ring into two parts; and subsequently removing at least one of the two parts from the tube.

2. A method according to claim 1, further comprising the step of smoothing the inside diameter of the tube in the vicinity of the weld.

3. A method according to claim 1, further comprising the steps of removing both parts of the ring and subsequently smoothing an inside diameter of the tube.

4. A method of welding a nozzle in a weld area, comprising the steps of:

fitting a ring having an outside diameter which is approximately equal to an inside diameter of the nozzle into the nozzle and over the area to be welded;

providing an annular groove on the outside diameter of the ring which extends under the area to be welded to form a purge space between the ring and the nozzle;

inserting the ring into the nozzle before the repair is made;

scribing an area on the ring which corresponds to the area to be welded;

removing the scribed ring from the nozzle;

welding a bead in the vicinity of the scribed area;

re-inserting the ring into the nozzle until the bead corresponds with the area to be welded;

welding the area to be welded in the presence of a purge gas;

removing the ring by boring a hole into the ring which has a diameter greater than the diameter of the groove and smaller than the outside diameter of the ring, to divide the ring into two parts; and subsequently removing at least one of the two parts from the nozzle.

5. A method according to claim 4, further comprising the step of smoothing the inside diameter of the nozzle in the vicinity of the weld.

6. A method according to claim 4, further comprising the steps of removing both parts of the ring and subsequently smoothing an inside diameter of the nozzle.

* * * * *